(12) United States Patent
Meggiolan (10) Patent No.: US 9,287,651 B2
(45) Date of Patent: Mar. 15, 2016

(54) PROTECTIVE DEVICE FOR AN ELECTRICAL CONNECTION OF AN ON-BOARD DEVICE OF A BICYCLE

(71) Applicant: Campagnolo S.r.l., Vicenza (IT)

(72) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 38 days.

(21) Appl. No.: 13/918,039

(22) Filed: Jun. 14, 2013

(65) Prior Publication Data

US 2014/0004755 A1    Jan. 2, 2014

(30) Foreign Application Priority Data

Jun. 14, 2012    (IT) .............................. MI2012A1034

(51) Int. Cl.
| | |
|---|---|
| H01R 13/62 | (2006.01) |
| H01R 13/504 | (2006.01) |
| B62J 6/18 | (2006.01) |
| H01R 4/70 | (2006.01) |
| H01R 13/52 | (2006.01) |
| H01R 13/639 | (2006.01) |

(52) U.S. Cl.
CPC ............ *H01R 13/504* (2013.01); *B62J 6/18* (2013.01); *H01R 4/70* (2013.01); *H01R 13/5213* (2013.01); *H01R 13/6392* (2013.01)

(58) Field of Classification Search
USPC ......................................... 439/367–369, 371
IPC .......... H01R 13/6392, 13/5213, 13/506, 13/447, H01R 13/6395, 13/518
See application file for complete search history.

(56) References Cited

U.S. PATENT DOCUMENTS

| | | | | |
|---|---|---|---|---|
| 5,129,839 | A * | 7/1992 | VanSkiver | 439/367 |
| 6,250,946 | B1 * | 6/2001 | Tardy | 439/367 |
| 6,422,891 | B1 | 7/2002 | Huang | |
| 7,550,672 | B2 * | 6/2009 | Chadbourne et al. | 174/92 |
| 8,187,025 | B2 * | 5/2012 | Luzzi | 439/489 |
| 8,408,929 | B2 * | 4/2013 | Solon | 439/301 |
| 2004/0173373 | A1 | 9/2004 | Wentworth et al. | |
| 2006/0196687 | A1 * | 9/2006 | Bryla | 174/92 |

FOREIGN PATENT DOCUMENTS

GB    2343302 A    5/2000

OTHER PUBLICATIONS

Italian Search Report and Written Opinion in Italian Application No. IT MI20121034, issued Feb. 28, 2013.
European Application No. 13 171 868.6-1801, issued Apr. 1, 2015.

* cited by examiner

*Primary Examiner* — Hien Vu
(74) *Attorney, Agent, or Firm* — Volpe and Koenig, P.C.

(57) ABSTRACT

A device for protecting an electrical connection on a bicycle. The protective device has first and second protective elements that are configured to be fixedly coupled with an electrical connection on opposite sides and a connector for removably coupling the first and second protective elements. Preferably, the connector elements for removably coupling the protective elements are formed as one piece with the respective first and second protective elements.

19 Claims, 8 Drawing Sheets

PROTECTIVE DEVICE FOR AN ELECTRICAL CONNECTION OF AN ON-BOARD DEVICE OF A BICYCLE

FIELD OF THE INVENTION

The present invention relates to a protective device for an electrical connection of an on-board device of a bicycle.

BACKGROUND

As known, bicycles often have electric, electronic and/or electromechanical devices mounted thereon in order to achieve certain purposes. For example, such devices can be provided for controlling and/or managing the gearshift and/or for acquiring, processing and/or storing parameters and/or data relating to the cyclist and/or to the bicycle and/or to the journey. The on-board devices can also be provided for mobile telephony, for multimedia and/or for bicycle antitheft purposes.

Typically, on-board bicycle devices have cabled electrical connections or wireless connections. In the case of cabled electrical connections, each electrical connection comprises an electromechanical junction of two distinct electrical connectors, each connector being associated with a terminal of a respective electric cable. Such cables in many cases are passed inside the frame of the bicycle so as to be hidden from view.

Typically, in order to ensure that the electrical connection is kept in operation and to ensure adequate protection, according to the international code IP, a sheath of heat-shrinking material is applied to the outer surface of the electrical connection.

It is also necessary to periodically have access to the electrical connection and disconnect the two electrical connectors. For example, this might be done in order to replace a connector or a cable.

The Applicant observed that the provision of a heat-shrinking sheath onto the connectors, as well as being very laborious, produces undesired stresses on the connectors, which can thus move with respect to one another, with the risk of obtaining a faulty connection or not obtaining the connection at all. In this case, and more generally whenever it is necessary to have access to the electrical connection (like for example when a connector or a cable needs to be replaced), the heat-shrinking sheath needs to be destroyed in order to be able to access to the connectors, with the risk of damaging the connectors and with the need to use a new heat-shrinking sheath when the connection is restored. Thus, the Applicant has found that the use of a heat-shrinking sheath complicates making and maintaining the electrical connections of on-board bicycle devices.

The technical problem at the basis of the present invention is therefore that of ensuring that the electrical connections of on-board devices of a bicycle have adequate protection in operation in a simpler and quicker way than what can be obtained using a heat-shrinking sheath, so as to be able to easily achieve the desired characteristics of stability and effectiveness of the electrical connection.

The present invention therefore relates to a protective device for an electrical connection of an on-board device of a bicycle.

SUMMARY OF THE INVENTION

The invention provides a device for the protection of an electrical connection on board a bicycle. The protective device has a first protective element configured to be coupled with an electrical connection, a second protective element configured to be coupled with said electrical connection opposite the first protective element, and a connector for removably coupling the first and second protective elements together.

BRIEF DESCRIPTION OF THE DRAWINGS

The characteristics and advantages of the invention will be clear in view of the detailed description of some preferred embodiments that is made with reference to the attached drawings.

DESCRIPTIONS OF PREFERRED EMBODIMENTS

Throughout the present description and in the subsequent claims, the expression "on-board device" is used to indicate both an electric, electronic and/or electromechanical device of the stand-alone type, and a system which the aforementioned electric, electronic and/or electromechanical device is part of.

Throughout the present description and in the subsequent claims, the term "stable" or "stably" or "stability" is used to indicate a condition of absence of significant relative motion, where "significant relative motion" means a relative motion different from that which derives from clearances caused by dimensional tolerances.

Throughout the present description and in the subsequent claims, the terms "radial" and "axial" and the expressions "radially inner/outer" and "axially inner/outer" are used referring to the radial direction and to the axial direction of the electric cables associated with the aforementioned connectors. The terms "circumferential" and "circumferentially", on the other hand, are used referring to the direction of annular extension of the aforementioned electric cables.

Throughout the present description, the same reference numerals will be used to indicate the same structural and functional characteristics for like elements with the addition of the prime symbol "'".

The present invention relates to a protective device comprising a first protective element, a second protective element, and a connector for removably coupling said second protective element with said first protective element. Advantageously, the use of two protective elements capable of being removably coupled to one another and stably coupled with the electrical connection allows a stable and effective electrical connection to be obtained as well as faster and simpler operation of making and/or maintaining the electrical connection compared to what is required in the case in which a heat-shrinking sheath is used. In particular, the removable coupling of the two protective elements allows easy mounting/dismounting of the protective device onto/from the electrical connection, whereas the stable coupling of the two protective elements with the electrical connection allows the electrical connection to be kept in operation.

In accordance with the present invention, the two protective elements are applied onto the connectors after they have been coupled. The cables can then be passed inside components of the bicycle, like for example the frame or the handlebars. For example, the cables can be inserted within the frame through holes generally provided for other purposes, thus without the need to make specific holes on the frame just to pass the cables through. At least one of the aforementioned connectors is of a size such as to also be capable of passing through the aforementioned holes together with the respective cable. The assembly operations are thus simplified.

Preferably, the means for removably coupling are made in one piece with said first protective element and second protective element. Consequently, the mounting of the protective device on the electrical connection does not require the use of coupling elements other than the two protective elements.

Even more preferably, the means for removably coupling are made on axially opposite free end portions of said first protective element and second protective element. It is thus extremely easy to have access to the aforementioned coupling means both in the mounting step of the protective device onto the electrical connection and, above all, in the dismounting step thereof.

Preferably, said axially opposite free end portions of said first protective element and second protective element comprise first axial abutment surfaces for the first connector and the second connector, respectively. Advantageously, such axial abutment surfaces contribute to keeping the electrical connection in operation, preventing the two connectors from moving away from one another.

In a preferred embodiment of the protective device of the present invention, one of the free end portions of one of said first protective element and second protective element comprises, in a cross section thereof, a conical outer side surface portion and a undercut outer side surface portion arranged in a radially inner position with respect to the conical outer side surface portion, and one of the free end portions of the other of said first protective element and second protective element comprises, in a cross section thereof, a conical inner side surface portion and an undercut inner side surface portion arranged in a radially outer position with respect to said conical inner side surface portion.

Basically, the aforementioned conical and undercut surfaces allow a snap coupling to be made between the two protective elements. Such a type of coupling is particularly advantageous since it allows quick and easy locking of the two protective elements onto the electrical connection without the need to use any tool, also ensuring high stability of the lock achieved and allowing easy dismounting of the two protective elements through a conventional tool (like for example a screwdriver).

Preferably, one of the axially opposite free end portions of each of said first protective element and second protective element comprises a first seat for the passage of a first electric cable connected to the first connector and the other of the axially opposite free end portions of each of said first protective element and second protective element comprises a second seat for the passage of a second electric cable connected to the second connector.

More preferably, when the first protective element is coupled with the second protective element, the first seat and the second seat define a circular opening for the contactless passage of said first electric cable and second electric cable. In this way, the electric cables are prevented from being subjected to undesired stresses by the respective connectors, both in the mounting step of the protective device onto the electrical connection and in operation.

In preferred embodiments of the protective device of the present invention, each of said first protective element and second protective element comprises, in an axially inner position with respect to one of the axially opposite free end portions, a first housing seat for housing the first connector and, in an axially inner position with respect to the other of the axially opposite free end portions, a second housing seat for housing the second connector. Therefore the coupling between protective elements and electrical connectors takes place at suitable seats formed on the two protective elements, thus ensuring the correct mutual positioning of the connectors inside the protective device.

Preferably, the first housing seat comprises a radial abutment surface for the first connector and the second housing seat comprises a radial abutment surface for the second connector. Advantageously, the radial abutment exerted by the aforementioned housing seats contributes to achieving a precise and stable coupling between connectors and protective device, thus enhancing the stability and effectiveness of the electrical connection in operation.

In particularly preferred embodiments of the protective device of the present invention, each of said first protective element and second protective element comprises, in an axially inner position with respect to the first housing seat and to the second housing seat, a third housing seat for housing a portion of increased diameter of a female connector of said first connector and second connector.

Preferably, said third housing seat comprises a radial abutment surface for said portion of increased diameter. This further contributes to the stability and effectiveness of the electrical connection in operation.

Preferably, at least one of said first housing seat and second housing seat defines a first shoulder for axial abutment of said portion of increased diameter. Such an axial abutment contributes to keeping the electrical connection in operation, preventing the female connector from moving axially along a first direction. This further contributes to the stability and effectiveness of the electrical connection in operation.

Even more preferably, each of said first protective element and second protective element comprises a second shoulder for axial abutment of said portion of increased diameter. Such a further axial abutment prevents the female connector from moving axially along a second direction opposite to said first direction, again enhancing the stability and effectiveness of the electrical connection in operation.

Preferably, the second shoulder is made on said first protective element and second protective element in an axially centered position.

Even more preferably, the second shoulder comprises a radial abutment surface for the female connector. This again enhances the stability and effectiveness of the electrical connection in operation.

In particularly preferred embodiments of the protective device of the present invention, each of said first protective element and second protective element comprises, in an axially inner position with respect to the third housing seat, a fourth housing seat for housing a portion of further increased diameter of the female connector.

Preferably, the fourth housing seat comprises a radial abutment surface for said portion of further increased diameter.

Even more preferably, the third housing seat defines a third axial abutment surface for said portion of further increased diameter. All of this again enhances the stability and effectiveness of the electrical connection in operation.

In the particularly preferred embodiments of the protective device of the present invention, the first protective element and the second protective element are symmetrical with respect to a transversal middle plane.

More preferably, said first protective element and second protective element are identical. It is thus possible to make a single type of protective element that can then be used both as first protective element and as second protective element. In this case, the operator must just take care, in the mounting operation, to position the second protective element in the opposite direction to the direction of positioning of the first protective element.

In a possible alternative embodiment of the protective device of the present invention, fixing means for fixing the protective device to the frame of a bicycle are provided.

Preferably, such fixing means are made in one piece with the first protective element and with the second protective element, so as not to need fixing elements other than the two protective elements.

More preferably, the aforementioned fixing means comprise an eyelet formed in an axially centered position on the radially outer surface of each of said first protective element and second protective element.

In a further possible alternative embodiment of the protective device of the present invention, mutual holding means for holding the two protective elements are provided.

Such mutual holding means are preferably made in one piece with both of the protective elements, so as to keep the two protective elements constrained to one another during the transportation and mounting operations.

With reference to FIGS. 1-5, reference numeral 1 indicates a first embodiment of a protective device for an electrical connection 100 of an on-board device (not illustrated) of a bicycle (not illustrated). A set of three reference axes Xc, Yc, Zc is shown in the Figures.

Figure 2:
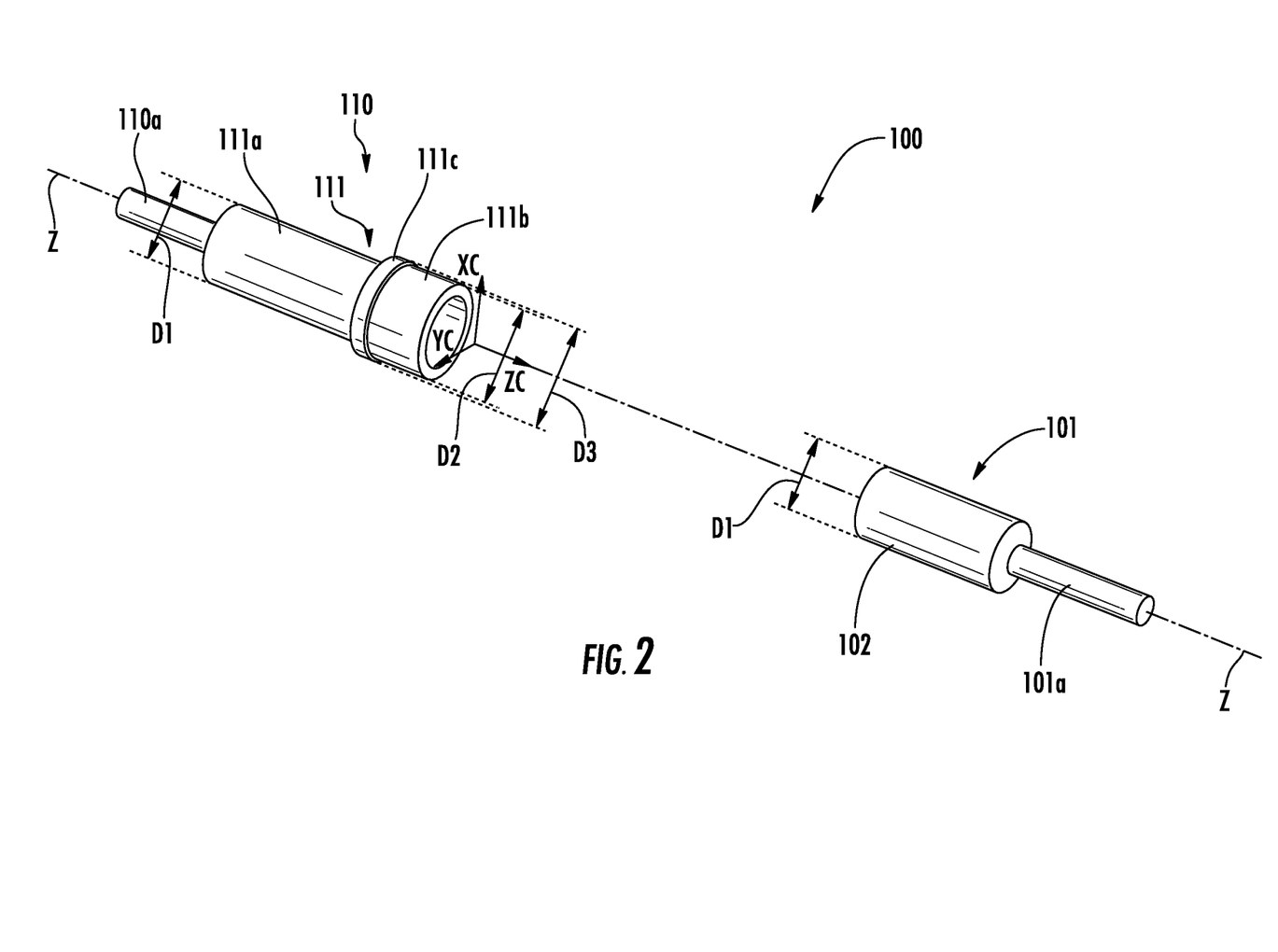
FIG. 2 is a schematic perspective view of the electrical connection used in combination with the protective device of FIG. 1, the electrical connection being in an inoperative configuration.

As shown in detail in FIG. 2, the electrical connection 100 comprises a male connector 101 coupled at an end thereof with a cable 101a and a female connector 110 coupled at an end thereof with a cable 110a. The coupling of the connectors 101 and 110 (and therefore of the cables 101a, 110a) takes place along a longitudinal axis Z coinciding with the longitudinal axis of the protective device 1 (and with axis Zc in the Figures).

The male connector 101 comprises a cylindrical body 102 of predetermined constant diameter D1 along the entire longitudinal extension of the cylindrical body 102 itself.

The female connector 110 comprises a cylindrical body 111 having, in a portion 111a thereof axially distal from its coupling end with the male connector 101, a diameter D1 equal to that of the cylindrical body 102 of the male connector 101. The cylindrical body 111 of the female connector 110 further comprises, in a portion 111b thereof proximal to its coupling end with the male connector 101, a diameter D2 greater than D1 (hereafter indicated as "increased diameter").

The portion 111b with increased diameter D2 has, close to the portion 111a, a portion 111c having a diameter D3 greater than D2 (hereafter indicated as "further increased diameter"), so as to define a substantially cylindrical collar. Preferably, diameter D1 is less than 5 mm, whereas diameter D2 is greater than 5 mm.

The connectors 101 and 110 are electro-mechanically coupled with one another through insertion of the cylindrical body 102 of the male connector 101 in the portion 111b with increased diameter D2 of the cylindrical body 111 of the female connector 110 along axis Z. As shown in FIGS. 1, 3-5, the protective device 1 extends longitudinally along axis Z and comprises two protective elements 10, 10'.

Figure 3:
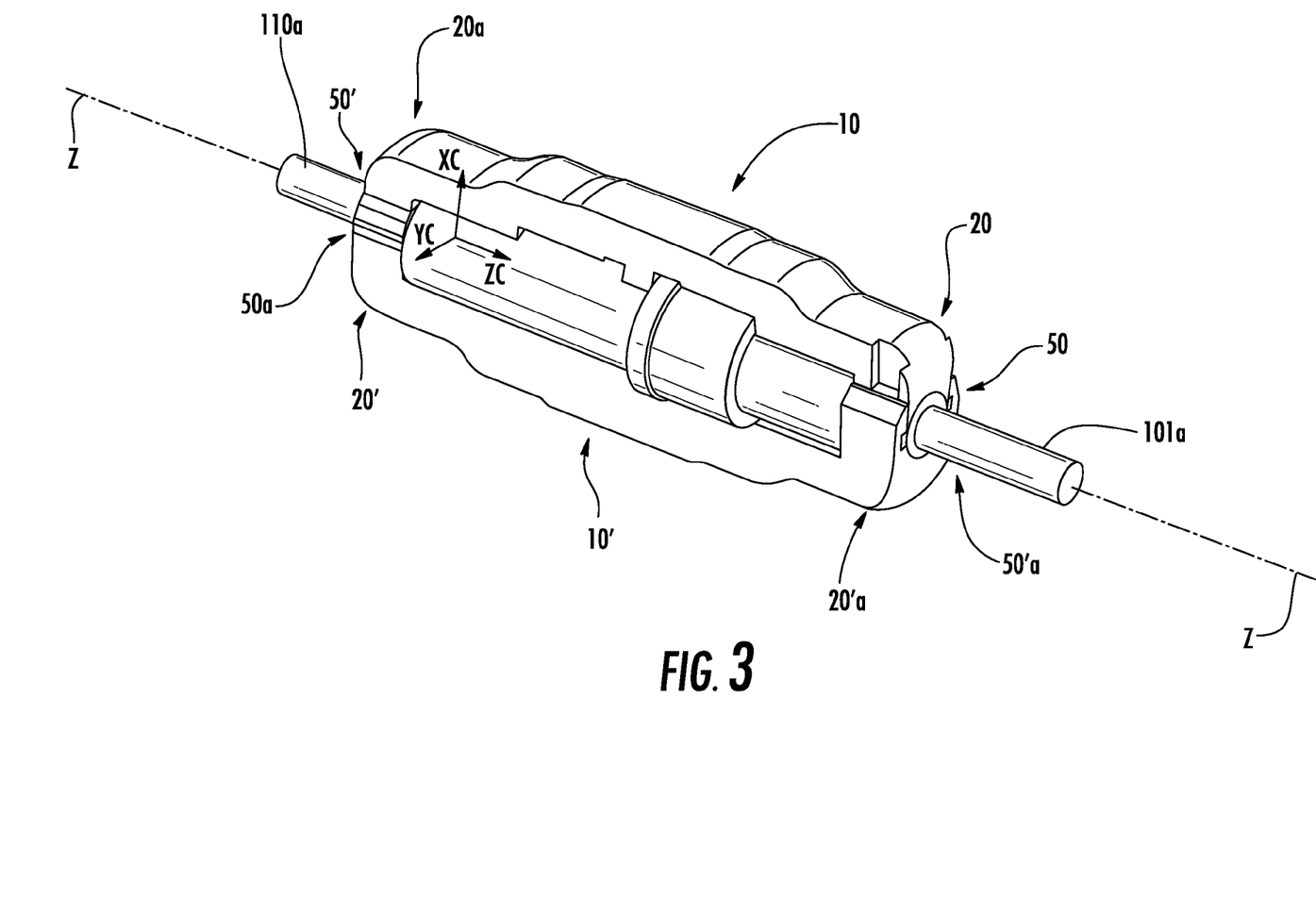
FIG. 3 is a schematic perspective view of the device of FIG. 1 in a final mounting configuration.
Figure 4:
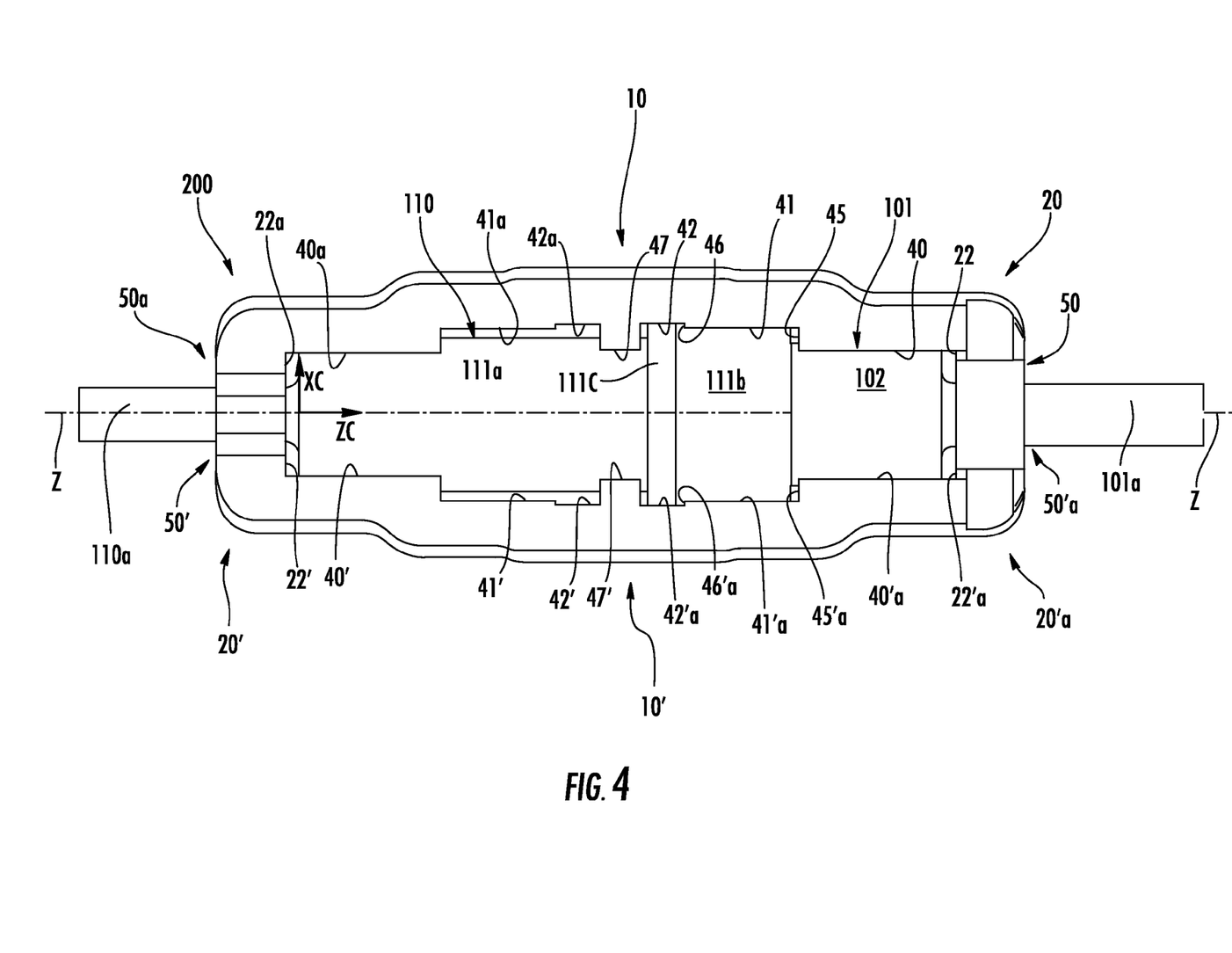
FIG. 4 is a schematic front view of the device of FIG. 1 in the final mounting configuration.
Figure 5:
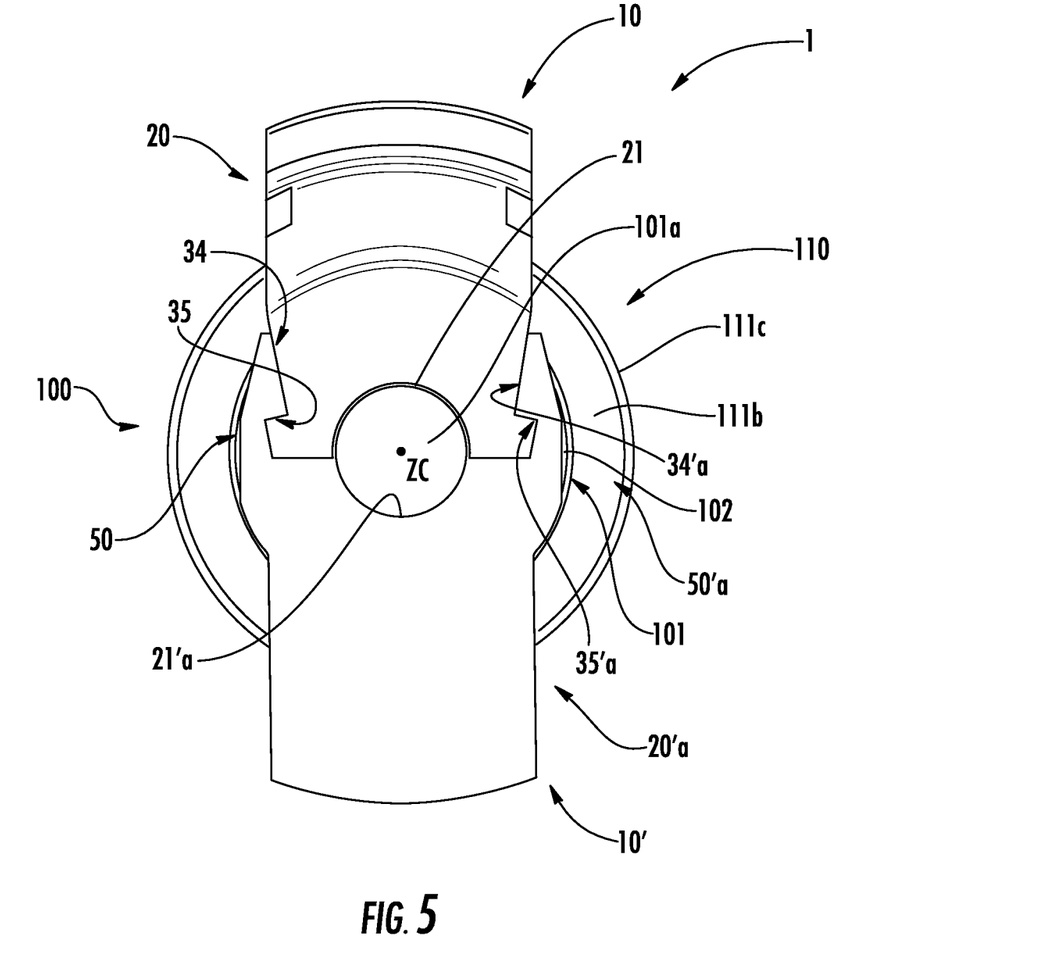
FIG. 5 is a schematic side view of the device of FIG. 1 in the final mounting configuration.

The two protective elements 10, 10' are configured to stably couple with the electrical connection 100 on diametrically opposite sides (for example parallel to axis Xc shown in the Figures) in order to obtain the configuration illustrated in FIGS. 3-5.

The protective elements 10, 10' are symmetrical with respect to a transversal middle plane. More preferably, the protective elements 10, 10' are identical to one another.

Due to the fact that the two protective elements 10, 10' are identical, throughout the present description and in the subsequent claims the protective element 10 is described in detail, with it being understood that all of the characteristics described with reference to such a protective element 10 are identically provided in the other protective element 10'.

Figure 6:
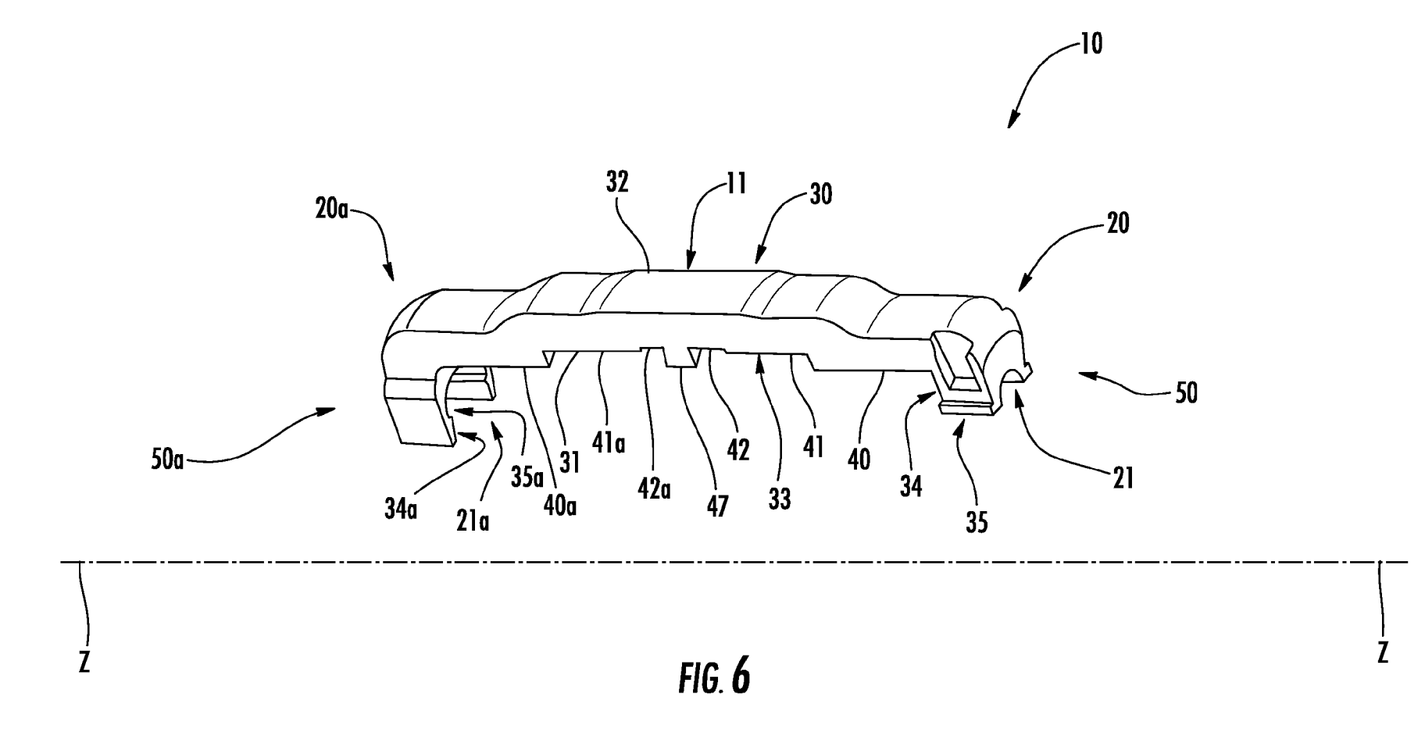
FIG. 6 is a schematic perspective view of a first element of the device of FIG. 1.

As shown in FIG. 6, the protective element 10 is defined by a body 11 made of plastic material and having an elongated shape in the direction of axis Z. The body 11 of the protective element 10 has opposite free end portions 20, 20a and a central portion 30 arranged between the end portions 20, 20a.

The central portion 30 has opposite flat outer side surfaces 31 (just one of these surfaces is visible in FIG. 6), a top surface 32 (or radially outer surface) defined by a cylindrical surface portion and a bottom surface 33 (or radially inner surface) also defined by a cylindrical surface portion.

The bottom surface 33 is shaped so as to couple with the connectors 101, 110, as described below.

Figure 1:
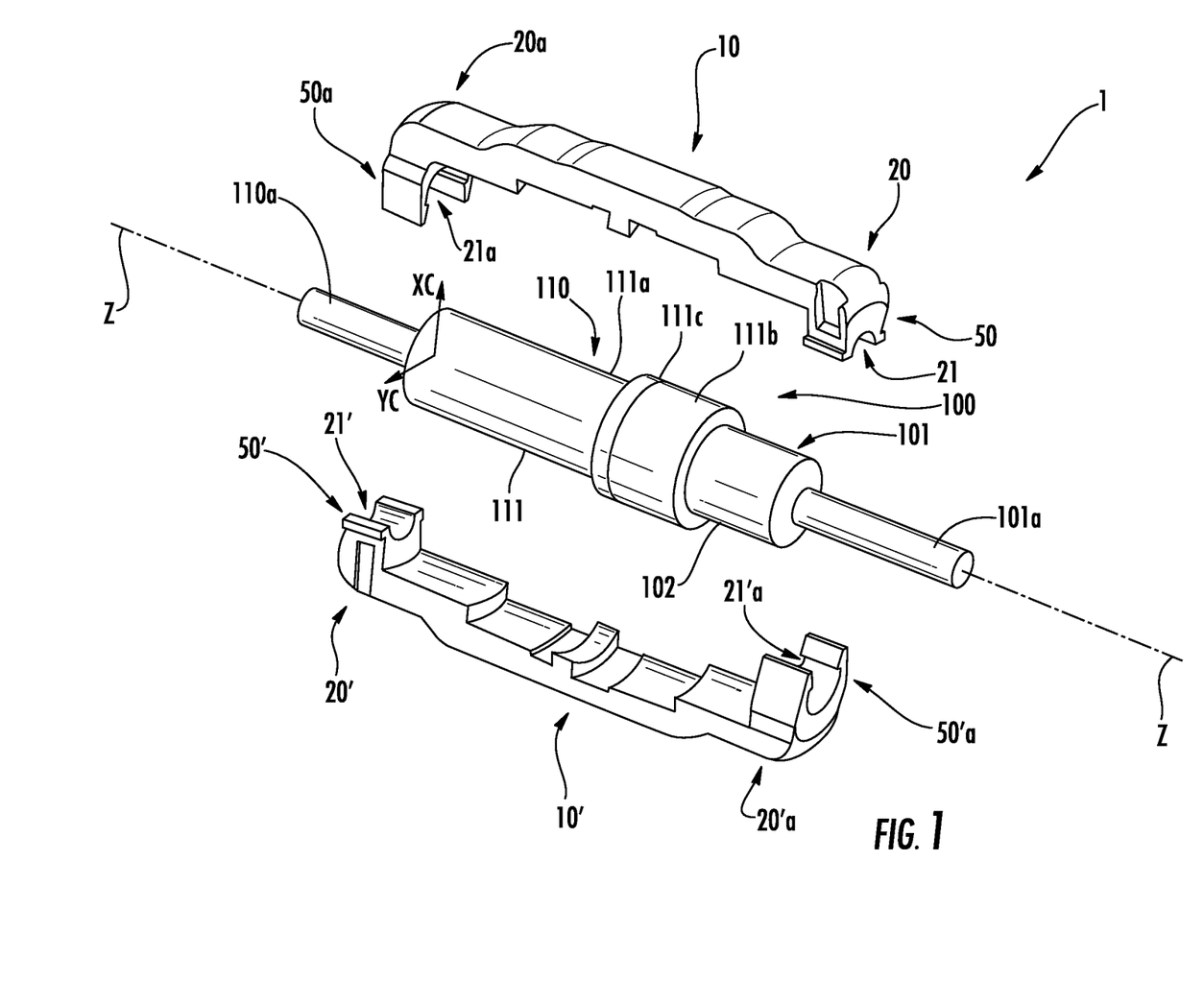
FIG. 1 is a schematic perspective and exploded view of a first embodiment of a protective device for an electrical connection of an on-board device of a bicycle, in accordance with the present invention.

With reference to FIGS. 1 and 6, the protective element 10 comprises, at the free end portion 20, a seat 21 for the passage of cable 101a and, at the free end portion 20a, a seat 21a for the passage of cable 110a. Similarly, with reference to FIGS. 1 and 7, the protective element 10' comprises, at the free end portion 20'a, a seat 21'a for the passage of cable 101a and, at the free end portion 20', a seat 21' for the passage of cable 110a.

The seats 21, 21a are semi-circular shaped. Consequently, when the protective element 10 is coupled with the protective element 10', the seats 21, 21'a define a circular opening that receives the cable 101a, whereas the seats 21a, 21' define a circular opening that receives the cable 110a. Such openings preferably have a diameter greater than the diameter of the cables 101a, 110a, so as to reduce as much as possible any possible stresses on the cables 101a, 110a due to the contact of the latter with the seats 21, 21a.

Again with reference to FIGS. 1 and 6, each free end portion 20, 20a of the protective element 10 comprises respective means 50, 50a for coupling with the other protective element 10'. Similarly, with reference to FIGS. 1 and 7, each free end portion 20', 20'a of the protective element 10' comprises identical means 50', 50'a for coupling with the protective element 10. In particular, the coupling means 50 of the end portion 20 of the protective element 10 are configured to couple with the coupling means 50'a of the end portion 20'a of the protective element 10' and the coupling means 50a of the end portion 20a of the protective element 10 are configured to couple with the coupling means 50' of the end portion 20' of the protective element 10'.

The coupling means 50, 50a, 50', 50'a are made in one piece with the respective end portions 20, 20a, 20', 20'a of the protective elements 10, 10' and are such as to achieve a removable snap coupling between the two protective elements 10, 10'.

Such a coupling is shown in FIG. 1 and even better in FIG. 5. This last Figure shows the protective device 1 of the electrical connection 10 when observed from the side of the end portion 20 of the protective element 10 (and, correspondingly, from the side of the end portion 20'a of the protective element 10').

In FIG. 5 it can be seen that the end portion 20 of the protective element 10 has, in a cross section thereof, a conical outer side surface portion 34 and, in a radially inner position with respect to the aforementioned conical outer side surface portion 34, an undercut outer side surface portion 35. The characteristics described above are also shown in FIG. 6 where it can be seen that projection and undercut portions 34 and 35 extend longitudinally along the end portions of the protective elements 10 and 10'. The surface portions 34 and 35 define the aforementioned coupling means 50 for coupling the protective element 10 with the protective element 10'.

Again in FIG. 5, it can also be seen that the end portion 20'a of the protective element 10' has, in a cross section thereof, a conical inner side surface portion 34'a and, in a radially outer position with respect to the aforementioned conical inner side surface portion 34'a, an undercut inner side surface portion 35'a. The characteristics described above are also shown in FIG. 7. The surface portions 34'a and 35'a define the aforementioned coupling means 50'a for coupling the protective element 10 with the protective element 10'.

FIG. 6 also shows that, at the free end portion 20a of the protective element 10 coupling means 50a are provided. Coupling means 50a are totally identical to coupling means 50'a provided on the free end portion 20'a of the protective element 10'. The coupling means 50a thus comprise a conical inner side surface portion 34a and, in a radially outer position with respect to the aforementioned conical inner side surface portion 34a, an undercut inner side surface portion 35a.

Figure 7:
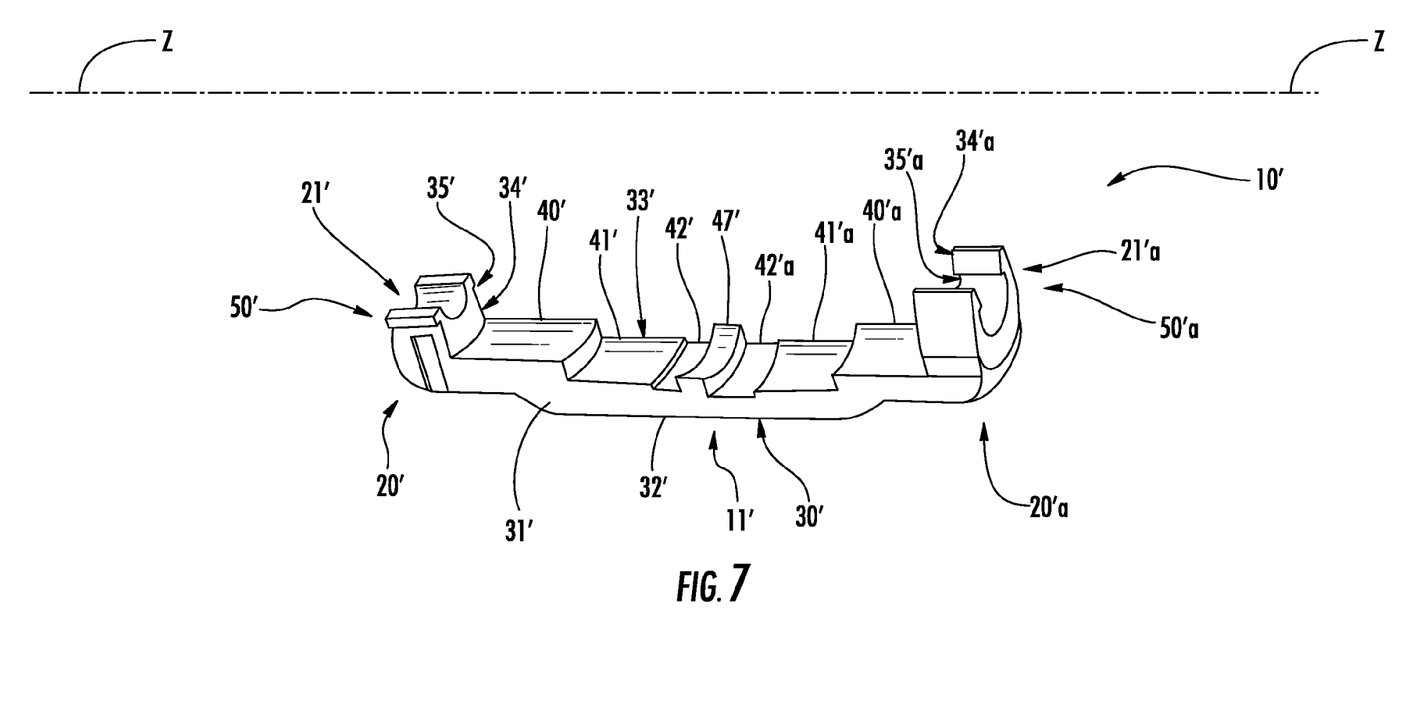
FIG. 7 is a schematic perspective view of a second element of the device of FIG. 1.

FIG. 7 also shows that, at the free end portion 20' of the protective element 10' coupling means 50' are provided. Coupling means 50' are totally identical to coupling means 50 provided on the free end portion 20 of the protective element 10. The coupling means 50' thus comprise a conical outer side surface portion 34' and, in a radially inner position with respect to the aforementioned conical outer side surface portion 34', an undercut outer side surface portion 35'.

The snap coupling of the protective elements 10, 10' is obtained by sliding the undercut outer side surface portion 35 of the end portion 20 of the protective element 10 onto the conical inner side surface portion 34'a of the end portion 20'a of the protective element 10' until the undercut outer side surface portion 35 of the end portion 20 of the protective element 10 couples with the undercut inner side surface portion 35'a of the end portion 20'a of the protective element 10'. Simultaneously, or immediately after, the conical inner side surface portion 34a of the end portion 20a of the protective element 10 is slid onto the undercut outer side surface portion 35' of the end portion 20' of the protective element 10' until the undercut inner side surface portion 35a of the end portion 20a of the protective element 10 couples with the undercut outer side surface portion 35' of the end portion 20' of the protective element 10'.

The decoupling of the protective elements 10, 10', on the other hand, can be obtained by using a conventional tool (like for example a screwdriver) at the free end portions 20, 20'a of the protective elements 10, 10', between the conical outer side surface portion 34 of the protective element 10 and the conical inner side surface portion 34'a of the protective element 10' and, at the opposite free end portions 20a, 20' of the protective elements 10, 10', between the conical inner side surface portion 34a of the protective element 10 and the conical outer side surface portion 34' of the protective element 10'. Once the aforementioned tool has been positioned between the aforementioned surface portions, the tool is pushed axially so as to cause the aforementioned surface portions to move apart sufficiently to allow, at the free ends 20, 20'a of the protective elements 10, 10', the decoupling of the undercut outer side surface portion 35 of the protective element 10 from the undercut inner side surface portion 35'a of the protective element 10' and, at the opposite free ends 20a, 20' of the protective elements 10, 10', the decoupling of the undercut inner side surface portion 35a of the protective element 10 from the undercut outer side surface portion 35' of the protective element 10'.

As shown in FIG. 4, the axially inner surfaces of the free end portions 20, 20'a of the protective elements 10, 10' define respective axial abutment surfaces 22, 22'a for the male connector 101, whereas the axially inner surfaces of the free end portions 20a, 20' of the protective elements 10, 10' define respective axial abutment surfaces 22a, 22' for the female connector 110. It should be specified that, although in FIG. 4 a space can be seen between the axial abutment surfaces 22, 22'a and the male connector 101 and between the axial abutment surfaces 22a, 22' and the female connector 110 these spaces are actually not present or, if present, they derive simply from the presence of a possible clearance due to dimensional tolerances.

As shown in FIGS. 4 and 6, the protective element 10 comprises, in an axially inner position with respect to the free end portion 20, a housing seat 40 for housing the male connector 101 and, in an axially inner position with respect to the free end portion 20a, a housing seat 40a for housing the female connector 110.

Correspondingly, as illustrated in FIGS. 4 and 7, the protective element 10' comprises, in an axially inner position with respect to the free end portion 20'a, a housing seat 40'a for housing the male connector 101 and, in an axially inner position with respect to the free end portion 20', a housing seat 40' for housing the female connector 110.

In the embodiment herein shown and described, the seats 40, 40a, 40', 40'a are defined by portions of cylindrical surfaces having a shape matching the cylindrical surface of the connectors 101, 110. When the protective elements 10, 10' are coupled, the housing seats 40, 40a, 40', 40'a go into radial abutment onto the respective connectors 101, 110.

With reference to FIGS. 4 and 6, the protective element 10 further comprises, in an axially inner position with respect to the housing seat 40, a further housing seat 41 defined by a cylindrical surface portion having a shape matching the cylindrical surface of the portion of increased diameter 111b of the female connector 110. Similarly, the protective element 10 further comprises, in an axially inner position with respect to the housing seat 40a, a further housing seat 41a identical to the seat 41. When the protective elements 10, 10' are coupled, the housing seat 41 goes into radial abutment onto the portion of increased diameter 111b of the female connector 110, whereas the housing seat 41a remains radially spaced from the portion 111a of the female connector 110.

Correspondingly, with reference to FIGS. 4 and 7, the protective element 10' comprises, in an axially inner position with respect to the housing seat 40'a, a further housing seat 41'a defined by a cylindrical surface portion having a shape matching the cylindrical surface of the portion of increased diameter 111b of the female connector 110. Similarly, the protective element 10' comprises, in an axially inner position with respect to the housing seat 40', a further housing seat 41' identical to the seat 41'a. When the protective elements 10, 10' are coupled, the housing seat 41'a goes into radial abutment onto the portion of increased diameter 111b of the female connector 110, whereas the housing seat 41' remains spaced from the portion 111a of the female connector 110.

As shown in FIG. 4, due to the difference in diameter of the portions of cylindrical surface of the housing seats 41, 41'a, with respect to the housing seats 40, 40'a, the housing seats 40, 40'a of the protective elements 10, 10' define respective shoulders 45, 45'a. When the protective elements 10, 10' are coupled, the shoulders 45, 45'a go into axial abutment against the portion of increased diameter 111b of the female connector 110. It should be specified that, although in FIG. 4 a space can be seen between the shoulders 45, 45'a and the portion of increased diameter 111b of the female connector 110, this space actually is not present or, if present, it derives simply from the presence of a possible clearance due to the dimensional tolerances.

Again with reference to FIGS. 4 and 6, the protective element 10 further comprises, in an axially inner position with respect to the housing seat 41, a housing seat 42 defined by a cylindrical surface portion having a shape matching the cylindrical surface of the portion of further increased diameter 111c of the female connector 110. Similarly, the protective element 10' comprises, in an axially inner position with respect to the housing seat 41a, a seat 42a identical to the seat 42. When the protective elements 10, 10' are coupled, the housing seat 42 goes into radial abutment onto the portion of further increased diameter 111c of the female connector 110, whereas the housing seat 42a remains radially spaced from the portion 111a of the female connector 110.

Correspondingly, with reference to FIGS. 4 and 7, the protective element 10' comprises, in an axially inner position with respect to the housing seat 41'a, a further housing seat 42'a defined by a cylindrical surface portion having a shape matching the cylindrical surface of the portion of further increased diameter 111c of the female connector 110. Similarly, the protective element 10' comprises, in an axially inner position with respect to the housing seat 41', a further housing seat 42' identical to the seat 42'a. When the protective elements 10, 10' are coupled, the housing seat 42'a goes into radial abutment onto the portion of further increased diameter 111c of the female connector 110, whereas the housing seat 42' remains radially spaced from the portion 111a of the female connector 110.

As shown in FIG. 4, due to the difference in diameter of the portions of cylindrical surface of the housing seats 42, 42'a with respect to the housing seats 41, 41'a, the housing seats 41, 41'a of the protective elements 10, 10' define respective shoulders 46, 46'a. When the protective elements 10, 10' are coupled, the shoulders 46, 46'a go into axial abutment against the portion of further increased diameter 111c of the female connector 110. It should be specified that, although in FIG. 4 a space can be seen between the shoulders 46, 46'a and the portion of further increased diameter 111c of the female connector 110, this space actually is not present or, if present, it derives simply from the presence of a possible clearance due to dimensional tolerances.

Each protective element 10, 10' further comprises, in an axially centered position, a further respective shoulder 47, 47'. The shoulders 47, 47' are defined by a cylindrical surface portion having a shape matching the cylindrical surface of the portion 111a of the female connector 110. When the protective elements 10, 10' are coupled, the shoulders 47, 47' go into radial abutment against the portion 111b of the female connector 110 and into axial abutment against the portion of further increased diameter 111c of the female connector 110. Such an axial abutment takes place on the opposite side with respect to that at the shoulder 45, 45'. Also in this case, it should be specified that, although in FIG. 4 a space can be seen between the shoulders 47, 47' and the portion of further increased diameter 111c of the female connector 110, this space actually is not present or, if present, it derive simply from the presence of a possible clearance due to dimensional tolerances.

In the mounting operation, the protective elements 10, 10' are applied onto the connectors 101, 110 after the latter have been coupled with each other. The cable 101 with the respective male connector 101 is inserted within the frame (or handlebars) of the bicycle through holes provided thereon for other purposes (like for example the holes of diameter equal to 5 mm typically provided in bicycle frames for fixing other components) and is slid inside the frame until it is brought close to the female connector 110. The cable 110a with the respective female connector 110 is arranged outside the frame, preferably close to the on-board device connected to the electrical connection 100.

Once coupled, the protective elements 10, 10' are positioned on the connectors 101, 110. The protective elements 10, 10' are then coupled together through the coupling means 50, 50a, 50', 50'a described above. In this way the connection 100 is locked with respect to the protective elements 10, 10' both in the radial direction and in the axial direction.

Although in the embodiment described above and shown in FIGS. 1, 3-7 all of the seats 40, 40a, 40', 40'a, 41, 41a, 41', 41'a, 42, 42'a, 47, 47' have cylinder shaped surfaces for the radial abutment onto the respective portions of the connectors 101, 110, alternative embodiments are foreseen in which some of the aforementioned seats, or all of the aforementioned seats, have differently shaped surfaces. In general, the surfaces of the aforementioned seats can have any shape (even flat or irregular), provided that they are such as to ensure the radial abutment onto the respective portions of the connectors 101, 110.

Figure 8:
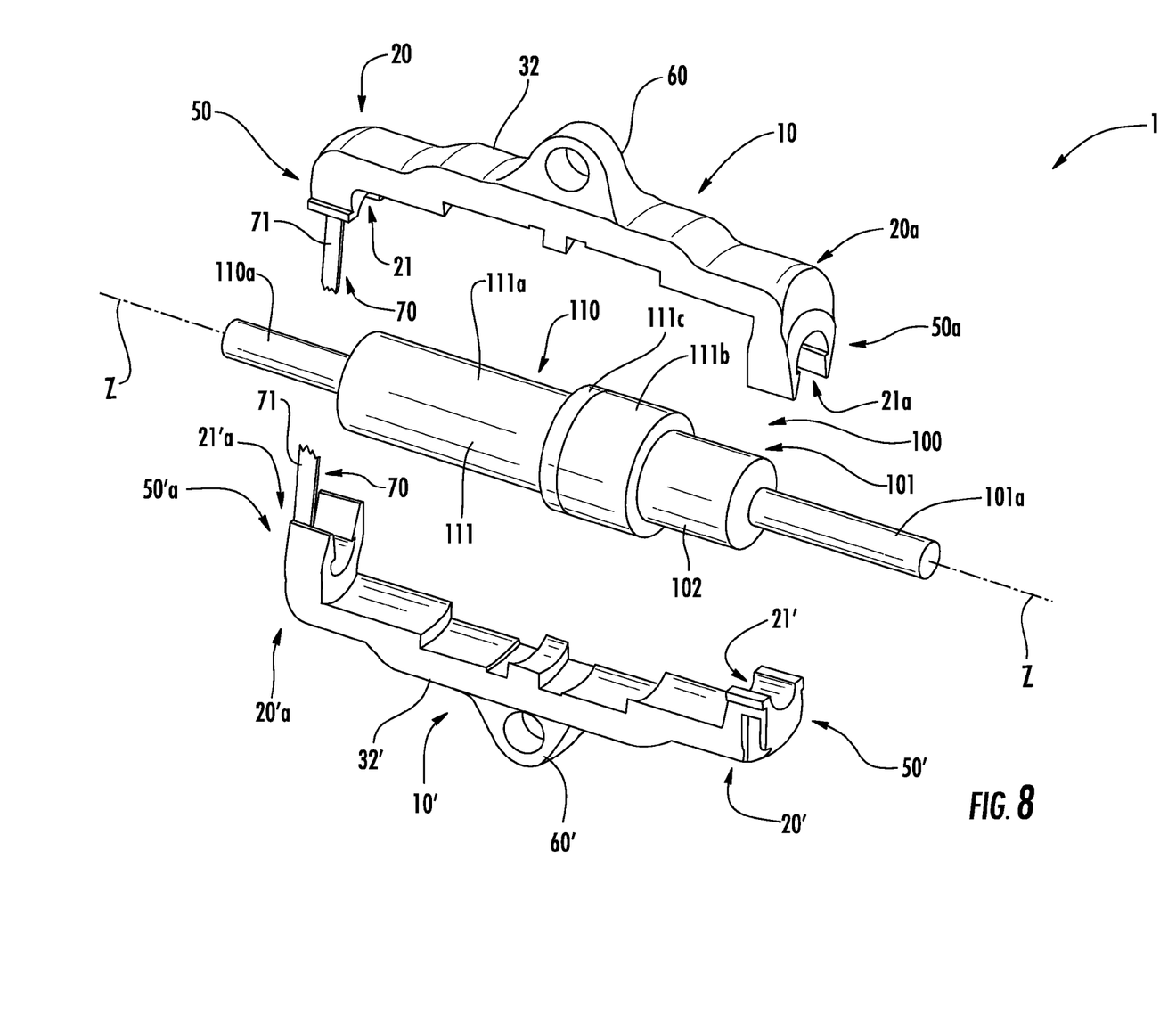
FIG. 8 is an exploded schematic perspective view of a possible alternative embodiment of the protective device of FIG. 1.

FIG. 8 shows an alternative embodiment of the protective device 1 described above.

The protective device of FIG. 8 differs from the one described above for the different orientation of the protective elements 10, 10' with respect to the connectors 101, 110 and in that the protective elements 10, 10' comprise respective connection points or fixing means 60, 60' to the frame of a bicycle and mutual gasket like fixing means 70. Otherwise, the connection elements 10, 10' shown in FIG. 8 are totally identical to those described above and, therefore, they will not be described again.

Unlike what has been described above, the protective element 10 of FIG. 8 is coupled with the male connector 101 at the free end portion 20a thereof and with the female connector 110 at the free end portion 20 thereof. Similarly, and unlike what has been described above, the protective element 10' of FIG. 8 is coupled with the male connector 101 at the free end portion 20' thereof and with the female connector 110 at the free end portion 20'a thereof.

The fixing means 60, 60' are made in one piece with the radially outer surface 32, 32' of the respective protective element 10, 10', in an axially centered position. Such fixing means are shaped as an eyelet, although it is possible to foresee different types or shapes, like for example hooks or slots.

The eyelets 60, 60' are configured to be fixed to the frame or to the handlebars of the bicycle through suitable locking bands.

The mutual fixing means 70 comprise, in the specific embodiment shown herein, a tongue 71 made in one piece with the protective elements 10, 10'.

The tongue 71 is preferably deformable, so as to allow the protective elements 10, 10' to be brought close to one another for the subsequent mutual coupling. Such deformability is obtained for example through a substantial reduction in the thickness of the tongue 71.

The longitudinal size of the tongue 71 is the minimum size for allowing the protective elements 10, 10' to be mounted on the connectors 101, 110. In this way, the tongue 71 can also not be removed in the mounting step and when mounting is completed.

The tongue 71 can alternatively be rigid. In this case it is configured to be removed at the mounting operation.

Of course, in the case in which the mutual fixing means 70 are made in one piece with the protective elements 10, 10', a batch of pieces will be produced in which each piece of the batch consists of the two protective elements 10, 10' and the mutual fixing means 70. If, on the other hand, the mutual fixing means 70 are made in a separate piece from the protective elements 10, 10', a batch of pieces will be produced in which each piece of the batch consists of just one of the protective elements 10, 10', the other protective element 10', 10 consisting of another piece of the same batch.

The mutual fixing means 70 of the protective elements 10, 10' can also be provided in the embodiment shown in FIGS. 1, 3-7 and described above. They can have a different shape and position with respect to what is shown in FIG. 8 and described above.

Of course, a man skilled in the art can bring numerous modifications and changes to the protective devices described above, in order to satisfy specific and contingent requirements, all of which are in any case within the scope of protection of the present invention as defined by the following claims.

What is claimed is:

1. A protective device for an electrical connection of an on-board device of a bicycle, said electrical connection comprising a first connector electro-mechanically coupled with a second connector, the protective device comprising:
   a first protective element that is configured to enclose a portion of said electrical connection;
   a second protective element that is configured to complement said first protective element and enclose said electrical connection within said first and said second protective elements; and
   coupling engagements for removably coupling said first protective element with said second protective element, wherein said first and second protective elements have exterior surfaces that are continuous between respective axial end portions, and at least one of the first and second protective elements has a preformed, rigid interior portion that complements an outer portion of said electrical connection and axially retains said electrical connection within said first and second protective elements, said coupling engagements for removably coupling includes interlocking parts that are made in one piece with said first protective element and second protective element, said interlocking parts for removably coupling are formed on axially opposite free end portions of said first protective element and second protective element, one of said free end portions of one of said first protective element and second protective element comprises, in a cross section thereof, a conical outer side surface portion and an undercut outer side surface portion arranged in a radially inner position with respect to said conical outer side surface portion, and wherein one of said free end portions of the other of said first protective element and second protective element comprises, in a cross section thereof, a conical inner side surface portion and an undercut inner side surface portion arranged in a radially outer position with respect to said conical inner side surface portion.

2. The protective device according to claim 1, wherein said axially opposite free end portions of said first protective element and second protective element comprise first axial abutment surfaces for said first connector and said second connector, respectively.

3. The protective device according to claim 1, wherein one of said axially opposite free end portions of each of said first protective element and second protective element comprises a first seat for passage of a first electric cable connected to said first connector and wherein the other of said axially opposite free end portions of each of said first protective element and second protective element comprises a second seat for passage of a second electric cable connected to said second connector.

4. The protective device according to claim 3, wherein, when said first protective element is coupled with said second protective element, said first seat and second seat define a circular opening for the contactless passage of said first electric cable and second electric cable.

5. The protective device according to claim 1, wherein each of said first protective element and second protective element comprises, in an axially inner position with respect to one of said axially opposite free end portions, a first housing seat for housing said first connector and, in an axially inner position with respect to the other of said axially opposite free end portions, a second housing seat for housing said second connector.

6. The protective device according to claim 5, wherein said first housing seat comprises a radial abutment surface for said first connector and said second housing seat comprises a radial abutment surface for said second connector.

7. The protective device according to claim 5, wherein each of said first protective element and second protective element comprises, in an axially inner position with respect to said first housing seat and second housing seat, a third housing seat for housing a portion of increased diameter of a female connector of said first connector and second connector.

8. The protective device according to claim 7, wherein said third housing seat comprises a radial abutment surface for said portion of increased diameter.

9. The protective device according to claim 7, wherein at least one of said first housing seat and second housing seat defines a first shoulder for axial abutment of said portion of increased diameter.

10. The protective device according to claim 7, wherein each of said first protective element and second protective element comprises a second shoulder for axial abutment of said portion of increased diameter.

11. The protective device according to claim 10, wherein said second shoulder comprises a radial abutment surface for said female connector.

12. The protective device according to claim 1, wherein said first protective element and second protective element are identical.

13. The protective device according to claim 1, comprising a connection point for fixing the protective device to a frame of a bicycle, said connection point being formed as one piece with at least one of said first protective element and second protective element.

14. The protective device according to claim 13, wherein connection points are formed on said first protective element and second protective element.

15. The protective device according to claim 14, wherein said connection point is an eyelet formed in an axially centered position on the radially outer surface of each of said first protective element and second protective element.

16. The protective device according to claim 13, wherein said connection point is an eyelet formed in a axially centered position on the radially outer surface of said at least one of said first protective element and second protective element.

17. The protective device according to claim 1, comprising mutual holding means for holding said first protective element and second protective element, said mutual holding means being preferably made in one piece with said first protective element and second protective element.

18. A protective device for an electrical connection of an on-board device of a bicycle, said electrical connection comprising a first connector electro-mechanically coupled with a second connector, the protective device comprising:
    a first protective element configured to be fixedly coupled with said electrical connection;
    a second protective element configured to be fixedly coupled with said electrical connection on a diametrically opposite side with respect to said first protective element; and,
    coupling engagements for removably coupling said first protective element with said second protective element,
    wherein said first and second protective elements extend continuously between respective axial end portions, and at least one of said first or second protective elements has a preformed, rigid interior portion with an inner diameter that is geometrically complementary to an outer diameter of an electric cable such that said electric cable is axially retained within said first and second protective elements, said coupling engagements for removably coupling includes interlocking parts that are made in one piece with said first protective element and second protective element, said interlocking parts for removably coupling are formed on axially opposite free end portions of said first protective element and second protective element, one of said free end portions of one of said first protective element and second protective element comprises, in a cross section thereof, a conical outer side surface portion and an undercut outer side surface portion arranged in a radially inner position with respect to said conical outer side surface portion, and wherein one of said free end portions of the other of said first protective element and second protective element comprises, in a cross section thereof, a conical inner side surface portion and an undercut inner side surface portion arranged in a radially outer position with respect to said conical inner side surface portion.

19. A protective device for an electrical connection of an on-board device of a bicycle, said electrical connection comprising a first connector electro-mechanically coupled with a second connector, the protective device comprising:
    a first protective element configured to be fixedly coupled on a first side of said electrical connection;
    a second protective element configured to be fixedly coupled on a diametrically opposite side of said electrical connection with respect to said first protective element;
    each of said first and second protective elements are identical to each other and each includes coupling engagements with interlocking male and female connectors on respective axially opposite end portions for removably coupling said first protective element with said second protective element, and
    said first protective element and said second protective element are positioned in oppositely facing directions and said female and male connectors are interconnected in a coupling connection, one of said end portions of one of said first protective element and second protective element comprises, in a cross section thereof, a conical outer side surface portion and an undercut outer side surface portion arranged in a radially inner position with respect to said conical outer side surface portion, and wherein one of said end portions of the other of said first protective element and second protective element comprises, in a cross section thereof, a conical inner side surface portion and an undercut inner side surface portion arranged in a radially outer position with respect to said conical inner side surface portion.

* * * * *